THERMOSTATIC MIXING REGULATOR

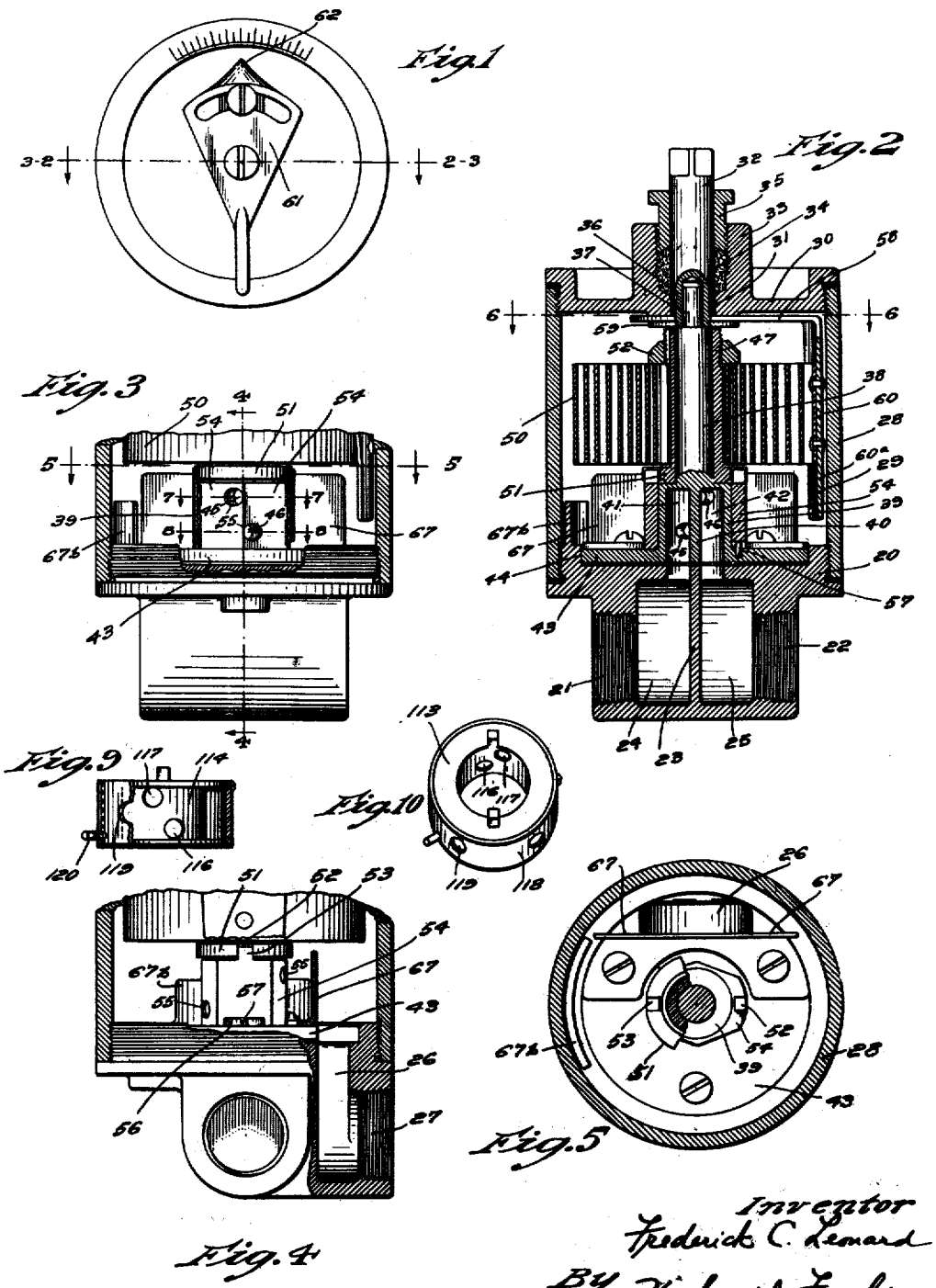
May 1, 1934. F. C. LEONARD 1,957,276
THERMOSTATIC MIXING REGULATOR
Filed Sept. 21, 1932 2 Sheets-Sheet 1
Inventor
Frederick C. Leonard
By Nathaniel Frucht
his Attorney May 1, 1934.  F. C. LEONARD  1,957,276

Filed Sept. 21, 1932  2 Sheets-Sheet 2

Inventor
Frederick C. Leonard
By Nathaniel Frucht
his Attorney

Patented May 1, 1934

1,957,276

UNITED STATES PATENT OFFICE 1,957,276

THERMOSTATIC MIXING REGULATOR

Frederick C. Leonard, Providence, R. I.

Application September 21, 1932, Serial No. 634,181

12 Claims. (Cl. 236—12)

My present invention relates to thermostatic regulators and has particular reference to regulators for mixing fluids of different temperatures to obtain a fluid of predetermined temperature.

The regulators designed for mixing fluids of definite temperatures have heretofore utilized valves for varying the inlet flow area, thus controlling the relative proportions of the different fluids, and have shifted the valves by means of thermostats which are subjected to the temperature of the mixed fluids and which are operatively connected to the valves, as by means of levers, fingers, or the like.

Such constructions require operating space, thus increasing the size of the regulator to take care of a given flow, and increasing the cost of manufacture and of assembly. It is the principal object of my invention to simplify the regulator construction by connecting the thermostatic element directly to the valve mechanism so as to produce direct movement of the valve mechanism upon movement of the thermostatic element in response to temperature changes of the mixed fluid.

To this end, I have devised a novel rotatable valve construction which is directly operated by or is attached to the thermostatic element, thus eliminating intermediate operating mechanism and its attendant friction and lost motion; and I have found that the novel construction permits a substantial reduction in the size of the regulator and thus reduces the cost of manufacture and of assembly, with further advantage in that the reduced size also increases the relative sturdiness and ruggedness of the regulator.

With the above and other objects and advantageous features in view, the invention consists of an improved method of control and a novel arrangement of parts more fully disclosed in the detailed description following, in conjunction with the accompanying drawings, and more particularly defined in the claims appended hereto.

In the drawings,

Fig. 1 is a top plan view of the novel regulator;

Fig. 2 is a vertical section thereof on the line 2—2 of Fig. 1:

Fig. 3 is a view similar to Fig. 1, parts being broken away, the valve mechanism being shown in elevation;

Fig. 4 is a section on the line 4—4 of Fig. 3;

Fig. 5 is a section on the line 5—5 of Fig. 3;

Fig. 9 is a vertical view, partly broken away, of a modified form of valve construction;

Fig. 10 is a perspective view of the same;

Figure 6:
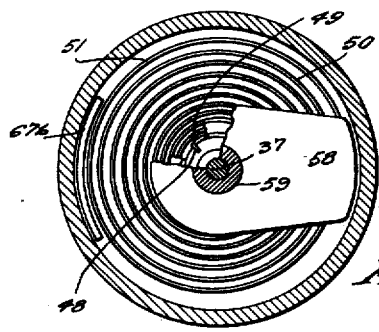
Fig. 6 is a section on the line 6—6 of Fig. 2, parts being broken away.

Referring to the drawings, particularly Fig. 2, the valve mechanism includes a base 20 which is provided with threaded inlets 21 and 22 for fluids of different temperatures, the inlets being separated by a partition 23 to provide inlet chambers 24, 25; the base 20 also has an outlet chamber 26, see Fig. 4, which communicates with a threaded outlet 27.

The upper end of the base 20 is recessed as shown in Figs. 2 and 3, and is threaded, to receive a similarly threaded casing 28, the interior of which provides a mixing chamber 29 positioned above the base 20. The upper end of the casing 29 is closed by means of a cap 30, which as shown is flanged to fit over the top of the casing 28 and to screw-threadedly engage therewith. Suitable packings of standard type are provided between the base, the cap, and the casing. The cap has a central bore 31 to accommodate a control shaft 32, a vertical flange 33 concentric with and spaced from the operating shaft extending upwardly to provide a packing recess 34 in which packing of usual type is inserted, the packing being locked in place by a flange nut 35 which is threadedly mounted in the flange 33. The lower end of the control shaft is bored or recessed as at 36 to provide a bearing for the reduced end 37 of a vertical shaft 38, this shaft having a cylindrical base 39 depending therefrom and preferably integral therewith, this base being separated by a vertical partition 40 into two valve chambers 41, 42, and having a terminal plate section 43 which sits in a circular recess 44 of the base 20, suitable packing being provided between the plate section and the base.

As best shown in Fig. 2, the two chambers 41, 42 communicate directly with the inflow chambers 24, 25, the two latter chambers being respectively provided with pairs of outflow ports 45, 46 which are spaced as shown on opposite sides of the base 39 to balance the pressures of the outflowing fluids therefrom.

A tubular element 47 is mounted on the shaft 38, this element having an external slot 48 extending vertically therein as indicated in Fig. 6, to receive the bent inner end 49 of a thermostat coil 50, the inner convolutions of the thermostat coil resting on the extended base 51 of the tubular element, and the upper end of the tubular element being threaded to receive a lock nut 52 for firmly locking the thermostatic element in place. The extended base 51 has spaced slots 52, which receive keys or fingers 53 of a cylindrical valve 54, this valve being provided with ports 55 which are adapted to register with the port openings 45, 46 as indicated in Fig. 3, whereby rotary movement of the valve increases the flow area of the ports which communicate with the chamber 41 and simultaneously decreases the flow area of the port openings which communicate with the chamber 42, and vice versa. As indicated in Figs. 2 and 4, the valve 54 has a slot 56 at the lower end thereof which is adapted to engage with a limit pin 57 seated in the plate, section 43 for limiting rotative movement of the valve.

Referring now to Figs. 1 and 2, the control shaft 32 has a plate 58 secured at the lower end thereof, as by a flange 59, the plate 58 being bent to provide a depending bracket portion 60 which is secured to the outer convolution of the thermostat coil, as by rivets or the like, and extends therebelow to provide a depending stop contact 60a which engages with an upstanding flange section 60b on the base. A handle 61 is mounted on the upper end of the control shaft for rotating the same, and an indicator 62 is formed on the handle for movement in unison with the handle and the control shaft, the end of the indicator cooperating with indicators or characters engraved or otherwise indicated on the rim of the cap, as indicated in Fig. 1.

Figure 7:
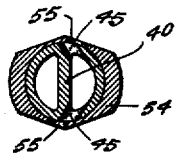
Fig. 7 and Fig. 8 are sections on the line 7—7 and 8—8 of Fig. 3.
Figure 8:
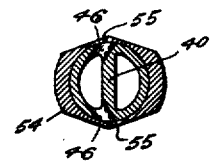
Figure 12:
Fig. 12 is a section on the line 10—10 of Fig. 9.
Figures 11, 14:
Fig. 11 is a vertical view of a modified form of valve chamber construction.
Fig. 14 is a section on the line 14—14 of Fig. 13.
Figure 15:
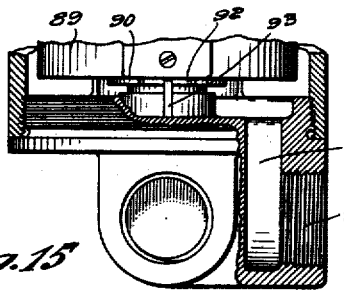
Fig. 15 is a fragmentary section on the line 15—15 of Fig. 13.

As shown in Figs. 7 and 8 the port openings 45, 46 are preferably slanted or inclined so as to bring the ports 45, 46 in vertical alignment. Instead of using slanting port openings, an alternative construction such as shown in Figs. 11 and 12 may be utilized, in which the two chambers 63, 64 are shaped as indicated whereby ports 65, 66 may be obtained by radial drilling, these ports being in vertical alignment, and thus balancing the pressures of the outflowing fluid.

The operation of the improved regulator may now be explained. Referring to Fig. 2 the inflowing fluids of different temperatures enter through inlets 21, 22 into the inlet chambers 24, 25 and thence pass upwardly into the outflow chambers 41, 42 and through the port openings 45, 46 and ports 55 into the mixing chamber 29 to contact the thermostat coil and then flow through the outlet chamber 26 to the outlet 27. To prevent direct flow into the outlet chamber, a shield 67, see Fig. 4, is positioned so as to force the inflowing streams of fluid to traverse the convolutions of the thermostat coil before entering the outlet chamber 26. The temperature of the outgoing fluid is controlled by rotating the handle 61, this rotation turning the thermostat coil so as to obtain a proper setting of the valve 54 to suitably proportion and control the flow of the hot and cold fluids through the ports 45 and 46. Any variation in the temperature of the mixed fluid causes a movement of the thermostat coil and thus directly rotates the valve 54 due to the connection of the tubular element 47 therewith, this tubular element of course moving as the inner end of the coil turns.

The above described constructions have been found very efficient for the desired temperature control, and have reduced the total volume of the regulator greatly in comparison with previous regulators, for the same flow capacity. For certain purposes, however, a still more compact regulator has been found desirable, and the constructions shown in Figs. 13 to 17 have been devised to obtain still greater compactness of the operating mechanism.

Figure 13:
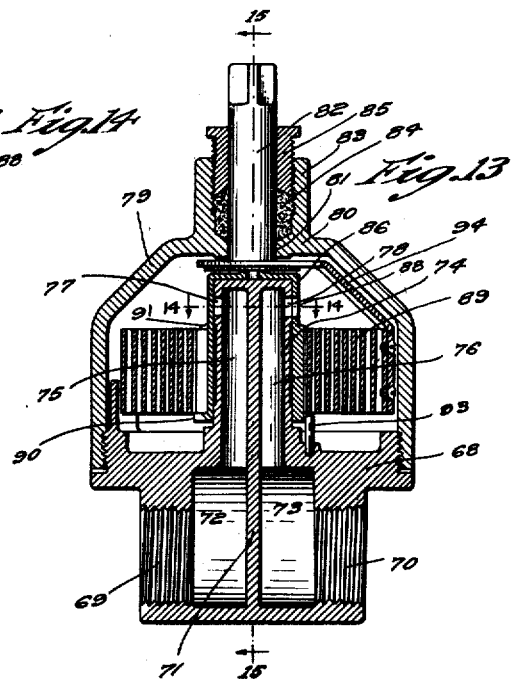
Fig. 13 is a vertical section of a modified form of regulator.

Referring to Fig. 13, the base 68 is similar in general construction to the base 20, being provided with threaded inlets 69, 70 and a central partition 71 which separates the adjacent portion of the base into two inflow chambers 72, 73. The upper portion of the base 68 is extended to provide a cylindrical section 74 which is separated by the upper portion of the partition 71 into two fluid chambers 75, 76; ports 77, 78 are provided at the upper ends of the chambers 75, 76 to permit outflow of the two fluids.

A cap 79 is threadedly mounted on the upper portion of the base 68, as shown in Fig. 11, and converges inwardly at the upper end thereof to provide a top section 80 with a central bore 81 in which a control shaft 82 is mounted, the top section having an upwardly extending flange 83 which is concentric with and spaced from the control shaft 82 to provide a packing recess 84 for receiving packing, a flange nut 85 of standard construction threadedly engaging the interior of the flange 83 to lock the packing in place.

A tubular hub 86 is mounted over the cylindrical section 74 and is provided with port openings 87, 88 which are adapted to register with the outflow openings 77, 78 as indicated in Fig. 12; a thermostat coil 89 is secured to the hub 86 at its inner end, and is locked in place in any desired manner, the preferred construction including a laterally extending lower flange 90 and an upper lock flange or the like 91. The lower flange 90 has a slot 92 therein, which cooperates with a limit pin 93 secured in the upper portion of the base 68.

The control shaft 82 has a plate bracket 94 secured to the lower end thereof, this plate being locked to the outer convolution of the thermostat coil by rivets or the like, and having a depending stop cooperating with an upwardly positioned stop flange segment on the base. The base 68 has a recess or outflow chamber 95 through which the mixed fluid passes on its way to the outlet opening 96.

The operation of this modified form of valve construction is similar to the operation of the first embodiment described, the entering fluids passing into the chambers 72, 73 and out through the port openings 77, 78, the extent of the outflow being governed by the position of the valve ports 87 and 88 as the valve moves in accordance with movement of the thermostat coil upon change of temperature of the mixed fluid. The two fluids thus emerge above the thermostat coil, thoroughly mix, and pass through the coil convolutions into the outflow chamber 95. If desired, the interior construction of the cylindrical section 74 may be similar to the construction shown in Figs. 7 and 8, or 11 and 12, and the number of outflow ports and valve openings may be increased to obtain the same outflow effect as in the first described embodiment.

Figure 16:
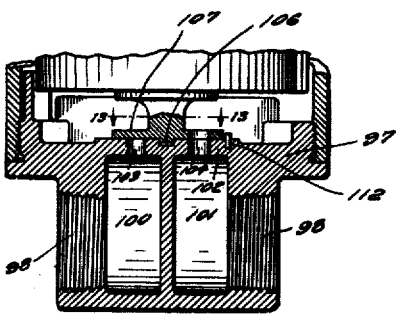
Fig. 16 is a view similar to Fig. 13 showing a modified form of valve mechanism therefor.
Figure 17:
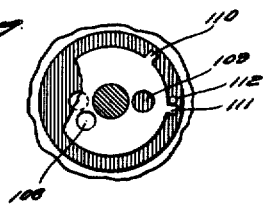
Fig. 17 is a section on the line 17—17 of Fig. 16.

Instead of using a tubular type valve such as shown in the previously described embodiments, a plate type valve such as indicated in Figs. 16 and 17 may be utilized. Referring to Fig. 16 the valve 97 is provided with inlets 98, 99 and inflow chambers 100 and 101 of the type disclosed in the other embodiments, and the general construction of the mixing chamber and control mechanism is similar; the upper portion of the base 97 may, however, be formed as a flat portion 102 provided with port openings 103, 104, and with a central recess 105 to receive a depending hub 106 of a plate valve 107 which is secured to the inner end of the thermostat coil in any desired manner, the preferred construction comprising a cylindrical hub or the like secured to the plate valve and extending within the thermostat coil to be riveted to the inner convolution thereof. The plate valve 107 is provided with spaced ports 108, 109 adapted to cooperate with the inflow ports 103, 104, and has spaced teeth or projections 110, 111 on the periphery thereof which cooperate with a limit pin 112 mounted in the base 97 so as to limit the rotatable movement of the plate valve.

The above described constructions utilize and permit direct flow of the hot and cold fluids from the inlet chambers to the mixing chamber. It has been found desirable, however, to provide a construction which permits a preliminary mixing, the valve construction illustrated in Figs. 9 and 10 being an example thereof.

The valve 113 comprises an inner element 114 of generally spool shape, the central cylindrical portion 115 having ports 116, 117 on opposite sides thereof to receive the fluids of different temperatures, the fluids entering a circular runway or mixing chamber formed by the cylindrical portion and the flanges of the spool element, and the outer cylindrical shell 118, the shell having outlets 119 communicating with the main mixing chamber containing the thermostatic element. If desired, the stop construction may be utilized comprising a pin 120, which may be secured to the spool element and project through the shell, the pin cooperating with spaced stop teeth or the like on the base. This construction produces a more uniform temperature regulation.

The practical thickness of the thermostatic element as utilized in the above described embodiments produces sufficient movement, for ordinary temperature ranges, to permit a large scale reading and to produce adequate valve movement without complications in view of the novel design of the port controls. If desired, the thermostat may be formed as a plurality of superimposed coils mounted for series movement to increase the operative movement and force; when using multiple coils of this type it is preferred to direct the fluid outflow through an initial annular mixing chamber into the main chamber containing the coils, the outflow being directed between the superimposed coils.

The above described constructions therefore provide a readily manufactured and easily assembled type of thermostatic regulator of small volume with respect to its flow capacity and with a minimum of operating parts, as the thermostatic element operates directly on the valve mechanism to produce the necessary change in flow volume of the two fluids.

While I have described specific constructional embodiments of my invention, such changes in the size, in the proportions, and in the relative arrangement of the parts, may be made as appear desirable for particular mixed fluid regulation installations, without departing from the spirit and the scope of the invention as defined in the appended claims.

I claim:

1. In a thermostatic mixing regulator, a base having inlet chambers for inflow of fluid of different temperatures and an outlet chamber for outflow of mixed fluid, a casing over said base forming a mixing chamber, said inlet chambers having port openings for communication with said mixing chamber, inlet flow control means in said mixing chamber including rotatable valve mechanism having ports cooperating with said port openings, and a thermostatic element mounted in said mixing chamber and operatively connected to said valve mechanism.

2. In a thermostatic mixing regulator, a base having inlet chambers for inflow of fluid of different temperatures and an outlet chamber for outflow of mixed fluid, a casing over said base forming a mixing chamber, said inlet chambers having openings for communication with said mixing chamber, inlet flow control means in the lower portion of said mixing chamber including rotatable valve mechanism having ports cooperating with said port openings, and a thermostatic element mounted in the upper portion of said mixing chamber and operatively connected to said valve mechanism.

3. In a thermostatic mixing regulator, a mixing chamber, a cylindrical hub element in said mixing chamber having separate flow passages therein and provided with port openings leading from said separate flow passages to said mixing chamber, movable valve means mounted on said hub and controlling the flow area of said port openings, and a thermostatic element mounted in said mixing chamber and operatively connected to said valve means.

4. In a thermostatic mixing regulator, a mixing chamber, a cylindrical hub element in the lower portion of said mixing chamber having separate flow passages therein and provided with port openings leading from said separate flow passages to said mixing chamber, movable valve means mounted on said hub and controlling the flow area of said port openings, and a thermostatic element mounted in the upper portion of said mixing chamber and operatively connected to said valve means.

5. In a thermostatic mixing regulator, a mixing chamber, a cylindrical hub element in said mixing chamber having separate flow passages therein and provided with port openings leading from said separate flow passages to said mixing chamber, the port openings for the separate flow passages being in alignment, movable valve means mounted on said hub and controlling the flow area of said port openings, and a thermostatic element mounted in said mixing chamber and operatively connected to said valve means.

6. In a thermostatic mixing regulator, a mixing chamber, a cylindrical hub element in the lower portion of said mixing chamber having separate flow passages therein and provided with port openings leading from said separate flow passages to said mixing chamber, the port openings for the separate flow passages being in alignment, movable valve means mounted on said hub and controlling the flow area of said port openings, and a thermostatic element mounted in the upper portion of said mixing chamber and operatively connected to said valve means.

7. In a thermostatic mixing regulator, a mixing chamber, a cylindrical hub element in said mixing chamber having separate flow passages therein and provided with port openings leading from said separate flow passages to said mixing chamber, rotatable valve means mounted on said hub and controlling the flow area of said port openings, and a thermostatic element mounted in said mixing chamber and operatively connected to said valve means.

8. In a thermostatic mixing regulator, a mixing chamber, a cylindrical hub element in said mixing chamber having separate flow passages therein and port openings leading from said separate flow passages to said mixing chamber, a support shaft on said hub element, movable valve means mounted on said hub and controlling the flow area of said port openings, and a thermostatic element mounted on said support shaft and operatively connected to said valve means.

9. In a thermostatic mixing regulator, a mixing chamber, a cylindrical hub element in said mixing chamber having separate flow passages therein and port openings leading from said separate flow passages to said mixing chamber, a support shaft on said hub element, rotatable valve means mounted on said hub and controlling the flow area of said port openings, and a thermostatic element mounted on said support shaft and operatively connected to said valve means.

10. In a thermostatic mixing regulator, a base having centrally positioned inflow chambers, a mixing chamber, partitioned walls separating said inflow chambers from said mixing chamber and having communication port openings therethrough, movable valve means having ports controlling flow through said port openings, and thermostatic means in said mixing chamber operatively connected to said valve means.

11. In a thermostatic mixing regulator, a base having centrally positioned inflow chambers, a mixing chamber, partition walls separating said inflow chambers from said mixing chamber and having communication port openings therethrough, rotatable valve means having ports controlling flow through said port openings, and thermostatic means in said mixing chamber operatively connected to said valve means.

12. In a thermostatic mixing regulator, a base having centrally positioned inflow chambers, a mixing chamber, partition walls separating said inflow chambers from said mixing chambers and having radial communication port openings therethrough, movable valve means having ports controlling flow through said port openings, and thermostatic means in said mixing chamber operatively connected to said valve means.

FREDERICK C. LEONARD.

CERTIFICATE OF CORRECTION.

Patent No. 1,957,276.   May 1, 1934.

FREDERICK C. LEONARD.

It is hereby certified that error appears in the printed specification of the above numbered patent requiring correction as follows: Page 4, line 80, claim 10, for "partitioned" read partition; and line 99, claim 12, for "chambers" read chamber; and that the said Letters Patent should be read with these corrections therein that the same may conform to the record of the case in the Patent Office.

Signed and sealed this 9th day of October, A. D. 1934.

(Seal)

Leslie Frazer
Acting Commissioner of Patents.

chamber and operatively connected to said valve means.

7. In a thermostatic mixing regulator, a mixing chamber, a cylindrical hub element in said mixing chamber having separate flow passages therein and provided with port openings leading from said separate flow passages to said mixing chamber, rotatable valve means mounted on said hub and controlling the flow area of said port openings, and a thermostatic element mounted in said mixing chamber and operatively connected to said valve means.

8. In a thermostatic mixing regulator, a mixing chamber, a cylindrical hub element in said mixing chamber having separate flow passages therein and port openings leading from said separate flow passages to said mixing chamber, a support shaft on said hub element, movable valve means mounted on said hub and controlling the flow area of said port openings, and a thermostatic element mounted on said support shaft and operatively connected to said valve means.

9. In a thermostatic mixing regulator, a mixing chamber, a cylindrical hub element in said mixing chamber having separate flow passages therein and port openings leading from said separate flow passages to said mixing chamber, a support shaft on said hub element, rotatable valve means mounted on said hub and controlling the flow area of said port openings, and a thermostatic element mounted on said support shaft and operatively connected to said valve means.

10. In a thermostatic mixing regulator, a base having centrally positioned inflow chambers, a mixing chamber, partitioned walls separating said inflow chambers from said mixing chamber and having communication port openings therethrough, movable valve means having ports controlling flow through said port openings, and thermostatic means in said mixing chamber operatively connected to said valve means.

11. In a thermostatic mixing regulator, a base having centrally positioned inflow chambers, a mixing chamber, partition walls separating said inflow chambers from said mixing chamber and having communication port openings therethrough, rotatable valve means having ports controlling flow through said port openings, and thermostatic means in said mixing chamber operatively connected to said valve means.

12. In a thermostatic mixing regulator, a base having centrally positioned inflow chambers, a mixing chamber, partition walls separating said inflow chambers from said mixing chambers and having radial communication port openings therethrough, movable valve means having ports controlling flow through said port openings, and thermostatic means in said mixing chamber operatively connected to said valve means.

FREDERICK C. LEONARD.

CERTIFICATE OF CORRECTION.

Patent No. 1,957,276.    May 1, 1934.

FREDERICK C. LEONARD.

It is hereby certified that error appears in the printed specification of the above numbered patent requiring correction as follows: Page 4, line 80, claim 10, for "partitioned" read partition; and line 99, claim 12, for "chambers" read chamber; and that the said Letters Patent should be read with these corrections therein that the same may conform to the record of the case in the Patent Office.

Signed and sealed this 9th day of October, A. D. 1934.

(Seal)

Leslie Frazer
Acting Commissioner of Patents.